United States Patent
Tanaka et al.

(10) Patent No.: US 10,502,563 B2
(45) Date of Patent: Dec. 10, 2019

(54) MEASUREMENT DEVICE

(71) Applicant: FANUC CORPORATION, Yamanashi (JP)

(72) Inventors: Shunpei Tanaka, Yamanashi (JP); Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/952,655

(22) Filed: Apr. 13, 2018

(65) Prior Publication Data

US 2018/0328726 A1   Nov. 15, 2018

(30) Foreign Application Priority Data

May 10, 2017   (JP) .................................. 2017-093942

(51) Int. Cl.
| | |
|---|---|
| *G01B 1/00* | (2006.01) |
| *G01B 17/08* | (2006.01) |
| *G01B 17/06* | (2006.01) |
| *G01S 7/521* | (2006.01) |
| *G01S 15/88* | (2006.01) |

(Continued)

(52) U.S. Cl.
CPC ............ *G01B 17/08* (2013.01); *G01B 17/06* (2013.01); *G01S 7/521* (2013.01); *G01S 7/539* (2013.01); *G01S 15/88* (2013.01); *G01S 15/003* (2013.01)

(58) Field of Classification Search
CPC ......... G01B 17/08; G01B 17/06; G01S 7/521; G01S 7/539; G01S 15/88; G01S 15/003
See application file for complete search history.

(56) References Cited

U.S. PATENT DOCUMENTS 5,062,297 A * 11/1991 Hashimoto ............ G01B 17/06
                                                              73/597
5,675,075 A * 10/1997 Arnold ................... G01H 3/125
                                                              73/105

(Continued)

FOREIGN PATENT DOCUMENTS

| CN | 87101750 A | 9/1987 |
|---|---|---|
| CN | 1932503 A | 3/2007 |

(Continued)

OTHER PUBLICATIONS

An Office Action mailed by the Japanese Patent Office dated Oct. 23, 2018, which corresponds to Japanese Patent Application No. 2017-093942 and is related to U.S. Appl. No. 15/952,655; with partial English translation.

(Continued)

*Primary Examiner* — Krystine E Breier
(74) *Attorney, Agent, or Firm* — Studebaker & Brackett PC

(57) ABSTRACT

A measurement device comprises: an ultrasonic vibrator that emits an ultrasonic wave to a measurement target; an acoustic lens; a sound-receiving element unit; an A/D converter array; a calculator connected to the A/D converter array; and a driving mechanism that makes the measurement target movable or tiltable relative to the ultrasonic vibrator. The calculator stores information in chronological order acquired by the sound-receiving element unit through scanning irradiation with the ultrasonic wave, converts the information stored in chronological order to space information, and acquires an acoustic intensity distribution.

3 Claims, 5 Drawing Sheets

(51) Int. Cl.
*G01S 7/539* (2006.01)
*G01S 15/00* (2006.01)

(56) References Cited

U.S. PATENT DOCUMENTS

| | | | | |
|---|---|---|---|---|
| 6,389,885 B1* | 5/2002 | Arnold | ............... | G01N 29/0681 |
| | | | | 73/105 |
| 8,092,018 B2* | 1/2012 | Miwa | ...................... | A61B 8/10 |
| | | | | 351/205 |
| 8,181,524 B2* | 5/2012 | Hara | ...................... | G01N 29/12 |
| | | | | 73/579 |
| 8,322,220 B2* | 12/2012 | Prater | .................... | G01Q 60/32 |
| | | | | 73/606 |
| 8,654,613 B2* | 2/2014 | Fukutani | .............. | A61B 5/0095 |
| | | | | 367/140 |
| 9,874,545 B2* | 1/2018 | Fukushima | .......... | G02B 21/002 |
| 2008/0276695 A1 | 11/2008 | Prater et al. | | |
| 2010/0069737 A1* | 3/2010 | Jinde | .................... | A61B 3/165 |
| | | | | 600/399 |
| 2017/0205385 A1* | 7/2017 | Prystupa | ................. | G01N 33/12 |
| 2018/0028117 A1* | 2/2018 | Desjardins | ........... | A61B 5/6848 |
| 2019/0142277 A1* | 5/2019 | Tokita | .................. | A61B 5/0095 |
| | | | | 600/407 |

FOREIGN PATENT DOCUMENTS

| | | |
|---|---|---|
| CN | 101011264 A | 8/2007 |
| CN | 101329306 A | 12/2008 |
| CN | 101966089 A | 2/2011 |
| CN | 102721746 A | 10/2012 |
| CN | 102741016 A | 10/2012 |
| CN | 102778510 A | 11/2012 |
| CN | 103149277 A | 6/2013 |
| CN | 203350230 U | 12/2013 |
| CN | 103959056 A | 7/2014 |
| CN | 105699487 A | 6/2016 |
| CN | 205748263 U | 11/2016 |
| CN | 106461615 A | 2/2017 |
| CN | 205941466 U | 2/2017 |
| DE | 4224209 A1 | 1/1993 |
| JP | S60-169708 A | 9/1985 |
| JP | S60-169708 U | 11/1985 |
| JP | H03-209158 A | 9/1991 |
| JP | H04-301761 A | 10/1992 |
| JP | H04-340463 A | 11/1992 |
| JP | H05-079828 A | 3/1993 |
| JP | H05-177512 A | 7/1993 |
| JP | H08-248017 A | 9/1996 |
| JP | 2008-082856 A | 4/2008 |
| JP | 5256450 B2 | 5/2013 |

OTHER PUBLICATIONS

An Office Action mailed by the State Intellectual Property Office dated Mar. 26, 2019, which corresponds to Chinese Patent Application No. 201810426089.6 and is related to U.S. Appl. No. 15/952,655; with English translation.

Hara et al.; A Novel Method for Noncontact Surface Topography by Air-coupled Ultrasound; Precision Engineering; vol. 74, No. 7; 2008; pp. 691-695.

An Office Action mailed by the Chinese Patent Office dated Jul. 31, 2019, which corresponds to Chinese Patent Application No. 201810426089.6 and is related to U.S. Appl. No. 15/952,655; with English language translation.

An Office Action issued by the German Patent Office dated Sep. 17, 2019, which corresponds to German Patent Application No. DE102018002838.1 and is related to U.S. Appl. No. 15/952,655.

* cited by examiner

MEASUREMENT DEVICE

This application is based on and claims the benefit of priority from Japanese Patent Application No. 2017-093942, filed on 10 May 2017, the content of which is incorporated herein by reference.

BACKGROUND OF THE INVENTION

Field of the Invention

The present invention relates to a measurement device that measures a target to be machined by a machine tool as a measurement target.

Related Art

Regarding a measurement device that measures the surface shape of a target to be machined by a machine tool, use of a non-contact measurement device unlikely to be affected by a cutting fluid, etc. has conventionally been known. Patent document 1 and non-patent document 1 describe techniques of measuring surface roughness using an ultrasonic wave.

FIG. 4 is a graph showing the profile curve of a surface of a test piece described in non-patent document 1. This graph shows a reference value measured by the stylus method (contact measurement method). FIG. 5 is a graph showing a relationship between a reflection intensity (coherent component) and surface roughness Rq described in non-patent document 1. A result in this graph shows that the reflection intensity reduces with increase in the surface roughness Rq. As understood from this graph, if a surface is rough, a scattered wave intensity is increased to reduce the reflection intensity. The methods described in patent document 1 and non-patent document 1 take advantage of this tendency to measure surface roughness using a coherent component and a non-coherent component.

Patent document 2 describes a technique of measuring surface roughness in a machine tool using an ultrasonic wave. The technique described in patent document 2 is to determine surface roughness during cutting by making an ultrasonic wave enter a cutting section diagonally through a liquid medium during the cutting, and then detecting a reflected beam from a surface of the cutting section and acquiring a resultant detection value.

There has also been a technique of measuring the shape of a measurement target by making scanning irradiation with an ultrasonic wave. Patent document 3 and patent document 4 disclose related techniques. Patent document 3 describes a flatness measurement device including: a fixing mechanism that fixes a plate-like subject in a vertical position and in an attachable and removable fashion; an ultrasonic probe facing at least one of the opposite main surfaces of the subject to be measured; a liquid bath housing the fixing mechanism and the ultrasonic probe; an ultrasonic distance meter that measures a distance between the probe and the subject measurement surface; an XY driving mechanism that makes the probe scan a parallel plane facing a measurement reference plane including any three points defined in a peripheral area of the subject measurement surface; a calculation mechanism that determines a difference between a distance between a probe scanning plane and the subject measurement surface facing the scanning plane and a distance between the scanning plane and the measurement reference plane measured by the distance meter, and calculates the flatness of the subject measurement surface by synchronizing the determined difference with scanning position information at the XY driving mechanism; and a calculation result display mechanism. Patent document 4 describes a surface unevenness detection device of an ultrasonic microscope including a mechanism for making scanning in an X-Z plane in addition to scanning in an X-Y plane, and a calculation circuit that determines the Z value of maximum brightness at each X position based on brightness data generated by the scanning in the X-Z plane.

Patent Document 1: Japanese Unexamined Patent Application, Publication No. 2008-82856
Patent Document 2: Japanese Unexamined Patent Application, Publication No. H05-177512
Patent Document 3: Japanese Unexamined Patent Application, Publication No. H05-79828
Patent Document 4: Japanese Unexamined Patent Application, Publication No. S60-169708
Non-Patent Document 1: Journal of the Japan Society of Precision Engineering, Vol. 74, No. 7 (2008), pp. 691-695 by Ikuo Ihara and Deden Dian Sukmana

SUMMARY OF THE INVENTION

A target of machining by a machine tool may have a complicated shape such as a mold. In this regard, each of patent documents 1 to 4 makes measurement of a target having a simple shape such as a plate-like shape or a columnar shape so finds difficulty in measuring a target having a complicated shape such as a mold by scanning with an ultrasonic wave. Referring to patent document 4, for example, scanning is made not only in the X-Y plane but also in the X-Z plane. Meanwhile, if a measurement target has a complicated shape, an angle of irradiation with an ultrasonic wave may be changed in response to a position of the irradiation to cause the risk of failing to measure unevenness correctly.

The present invention is intended to provide a measurement device for a machine tool with a structure allowing correct measurement of a surface shape through ultrasonic irradiation, even if a machining target has a complicated shape such as a mold.

(1) The present invention relates to a measurement device (measurement device 1 described later, for example) that measures a target (cutting target 51 described later, for example) to be machined by a machine tool as a measurement target. The measurement device comprises: an ultrasonic vibrator (ultrasonic vibrator 20 described later, for example) that emits an ultrasonic wave to the measurement target; an acoustic lens (acoustic lens 32 described later, for example) that focuses the ultrasonic wave emitted from the ultrasonic vibrator and reflected and diffracted on the measurement target; a sound-receiving element unit (sound-receiving element array 41 described later, for example) that converts the ultrasonic wave focused by the acoustic lens to an analog electrical signal; an A/D converter unit (A/D converter array 42 described later, for example) that converts the analog signal from the sound-receiving element unit to a digital signal; a calculator (calculator 43 described later, for example) connected to the A/D converter unit; and a driving mechanism (driving mechanism 53 described later, for example) that makes the measurement target movable or tiltable relative to the ultrasonic vibrator. The calculator stores information in chronological order acquired by the sound-receiving element unit through scanning irradiation with the ultrasonic wave, converts the information stored in chronological order to space information, and acquires an acoustic intensity distribution.

(2) The measurement device described in (1) may further comprise a numerical controller (numerical controller 60 described later, for example) that gives a command about a machining shape. The driving mechanism may move or tilt the ultrasonic vibrator, the acoustic lens, and the sound-receiving element unit in response to the machining shape acquired from the numerical controller.

(3) In the measurement device described in (1) or (2), the calculator may be capable of calculating the geometric dimensions and surface roughness of a fine structure based on the acquired acoustic intensity distribution.

(4) In the measurement device described in (2), the calculator may be capable of displaying the acquired spatial acoustic intensity distribution while overlapping the spatial acoustic intensity distribution with the machining shape.

Even if a machining target has a complicated shape such as a mold, the measurement device of the present invention still allows correct measurement of a surface shape through ultrasonic irradiation.

DETAILED DESCRIPTION OF THE INVENTION

Figure 1:
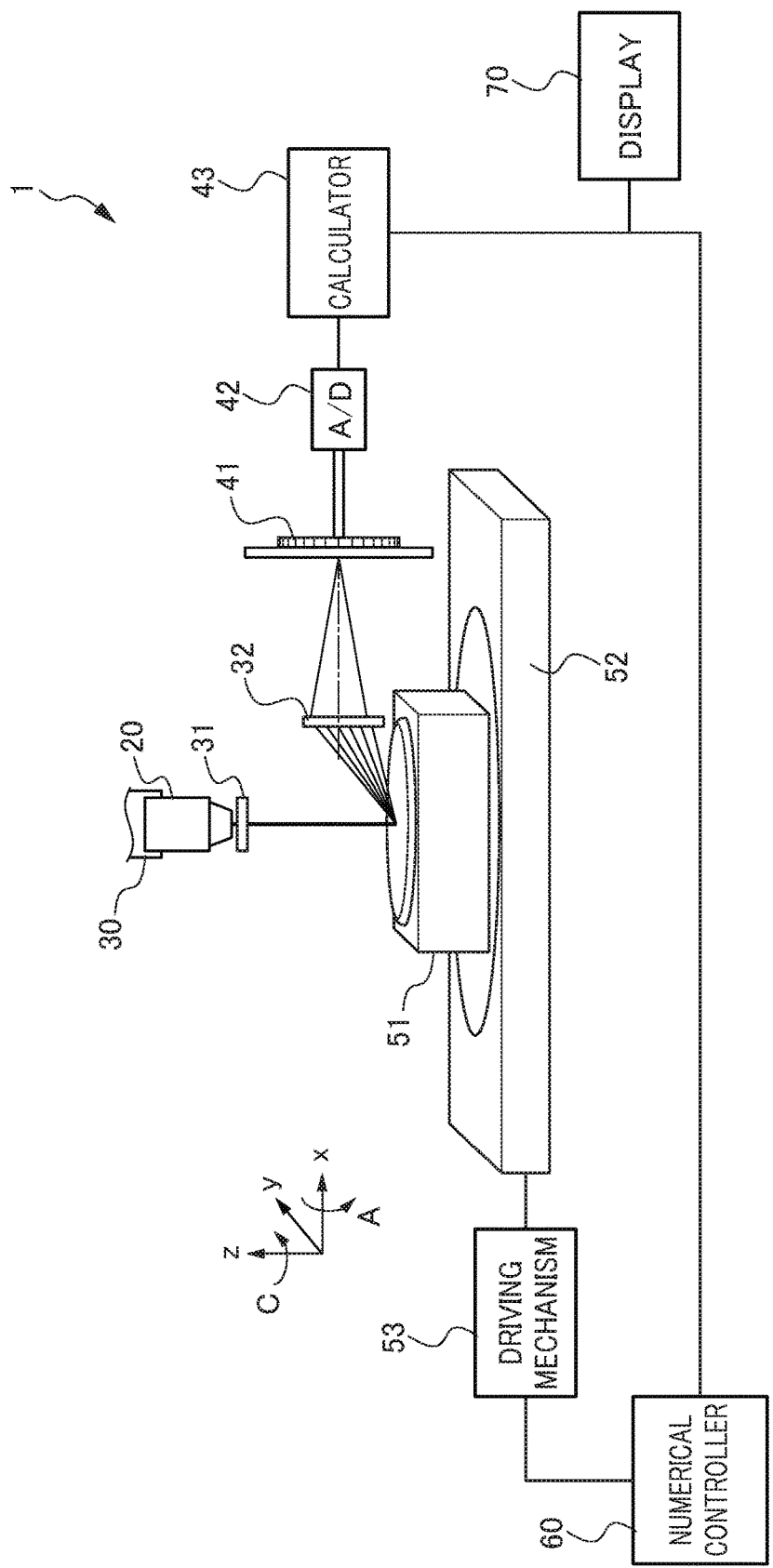
FIG. 1 schematically shows a measurement device according to an embodiment of the present invention.

Preferred embodiments of the present invention will be described below by referring to the drawings.

FIG. 1 schematically shows a measurement device 1 according to an embodiment of the present invention. The measurement device 1 shown in FIG. 1 is an on-machine measurement device to be arranged in a numerically-controlled (NC) machine tool to be driven by a motor such as a servo motor. The measurement device 1 is to measure the dimensions of a fine structure on a metal working surface finished with a cutting tool or a cutting grinder.

As shown in FIG. 1, the measurement device 1 of this embodiment includes a work table 52, an ultrasonic vibrator 20, a focusing part 31, an acoustic lens 32, a driving mechanism 53, a sound-receiving element array 41, an A/D converter array 42, a calculator 43, a numerical controller 60, and a display 70.

The work table 52 is a table on which a work as a target of measurement by the measurement device 1 is to be placed. In this embodiment, a cutting target 51 as a target of machining by the NC machine tool is placed on the work table 52.

The ultrasonic vibrator 20 is to emit an ultrasonic wave for measurement. The ultrasonic vibrator 20 is supported by a support 30 of the driving mechanism 53 and is configured to be capable of approaching the cutting target 51 as a measurement target.

The focusing part 31 focuses an ultrasonic wave. The focusing part 31 may be provided to belong to the ultrasonic vibrator 20 as a transmission side, to the work table 52 as a receiving side, or to each of the transmission side and the receiving side.

The acoustic lens 32 is a Fourier transform lens that focuses an ultrasonic wave scattered, diffracted, and reflected on the cutting target 51. The ultrasonic wave focused by the acoustic lens 32 is projected on a projection plane 33.

The sound-receiving element array 41 is a sound-receiving element unit that converts an acoustic signal at the projection plane 33 to an electrical signal, and transmits the electrical signal to the A/D converter array 42.

The A/D converter array 42 is an A/D converter unit that converts an analog signal output from the sound-receiving element array 41 to a digital signal. The digital signal from the A/D converter array 42 is transmitted to the calculator 43.

The calculator 43 is a computer including a CPU, a storage, etc. The calculator 43 performs measurement processing for calculating the dimensions and surface roughness of a fine structure on a surface of the cutting target 51 based on the digital signal received from the A/D converter array 42.

The numerical controller 60 gives a command to the machine tool about a machining shape to be determined for the cutting target 51. The machining shape is an intended shape about a machining target and is given as CAM data or an NC program, for example.

The driving mechanism 53 is a mechanism for shifting the respective positions of the ultrasonic vibrator 20, the cutting target 51, the acoustic lens 32, and the sound-receiving element array 41 relative to each other. In this embodiment, the driving mechanism 53 includes a feed axis for moving the work table 52 on which the cutting target 51 is placed in an X-axis direction and a Y-axis direction, and a tilting axis for tilting the cutting target 51 about the X-axis direction or a Z-axis direction as a rotary axis. In this way, the cutting target 51 is configured to be movable or tiltable relative to the ultrasonic vibrator 20.

Figure 2:
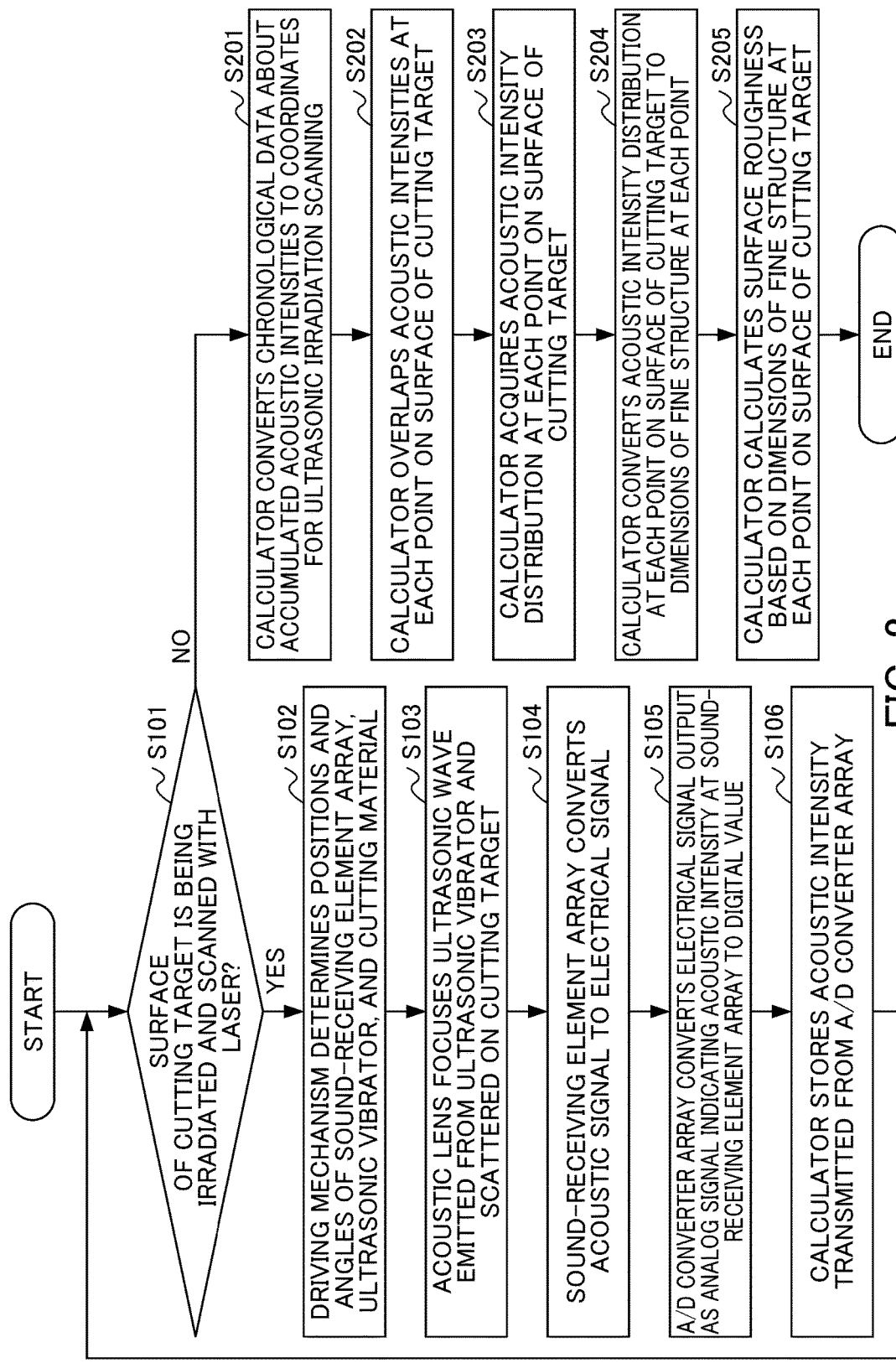
FIG. 2 is a flowchart showing a flow of measurement processing by a measurement device according to a first embodiment.

Processing of calculating the dimensions and surface roughness of a fine structure on a surface of the cutting target 51 followed by the measurement device 1 will be described next. FIG. 2 is a flowchart showing the flow of the measurement processing by the measurement device 1 according to the first embodiment.

When the measurement processing is started, the surface of the cutting target 51 is irradiated with an ultrasonic wave. Then, it is determined whether or not the surface of the cutting target 51 is being irradiated and scanned with an ultrasonic wave (step S101). The irradiation scanning by the ultrasonic vibrator 20 is done by repeating operation of irradiating a given point in an irradiation range determined in advance on the cutting target 51 with an ultrasonic wave, then moving the ultrasonic wave to a next point, and irradiating the next point with the ultrasonic wave.

If it is determined as a result of the process in step S101 that the ultrasonic irradiation scanning is being done, the respective positions and the respective angles of the sound-receiving element array 41, the ultrasonic vibrator 20, and the cutting target 51 are determined by the driving mechanism 53 (step S102).

After the positions and the angles are determined in step S102, the ultrasonic wave emitted from the ultrasonic vibrator 20 is focused on the focusing part 31 and applied to the cutting target 51. The acoustic lens 32 focuses the ultrasonic wave emitted from the ultrasonic vibrator 20 and scattered on the cutting target 51 (step S103). After the sound-receiving element array 41 receives the ultrasonic wave focused by the acoustic lens 32, the sound-receiving element array 41 converts an acoustic signal to an electrical signal (step S104).

The A/D converter array 42 converts the electrical signal output as an analog signal indicating an acoustic intensity at the sound-receiving element array 41 to a digital value (step S105). The calculator 43 stores the acoustic intensity transmitted from the A/D converter array 42 (step S106). After the process in step S106 is finished, the flow returns to step S101 and it is determined whether or not ultrasonic irradiation scanning is being done. If the scanning is being done, the flow from step S102 to step S106 is repeated. Acoustic intensities are stored in chronological order. If it is determined as a result of the determination process in step S101 that the ultrasonic irradiation scanning is not being done, the flow goes to step S201 and subsequent steps.

In step S201, the calculator 43 converts chronological data about accumulated acoustic intensities to coordinates for the ultrasonic irradiation scanning. The calculator 43 overlaps acoustic intensities at each point on the surface of the cutting target 51 (step S202). In the overlapping process, an acoustic intensity at each point is calculated while acoustic intensities in an area shifted from the center of an ultrasonic irradiation range at the time of the overlapping process are taken into consideration (in chronological order) at each point by noise canceling, for example. Next, the calculator 43 calculates an acoustic intensity at each point in the entire area of the surface of the cutting target 51 to acquire an acoustic intensity distribution at each point (step S203).

After the process in step S203 is finished, the calculator 43 performs process of converting the acoustic intensity distribution at each point on the surface of the cutting target 51 to the dimensions of a fine structure at each point (step S204). After the dimensions of the fine structure at each point on the surface of the cutting target 51 are acquired as a result of the process in step S204, the calculator 43 calculates surface roughness based on the acquired dimensions of the fine structure (step S205). For example, a formula defined in advance based on a relationship between a reflection intensity and surface roughness such as that described in non-patent document 1 may be used for the calculation of the dimensions and surface roughness of the fine structure based on the acoustic intensity distribution.

The above-described embodiment achieves the following effects. The measurement device 1 includes: the ultrasonic vibrator 20 that emits an ultrasonic wave to the cutting target (measurement target) 51; the acoustic lens 32 that focuses the ultrasonic wave emitted from the ultrasonic vibrator 20 and reflected and diffracted on the cutting target 51; the sound-receiving element array (sound-receiving element unit) 41 that converts the ultrasonic wave focused by the acoustic lens 32 to an analog electrical signal; the A/D converter array 42 that converts the analog signal from the sound-receiving element array 41 to a digital signal; the calculator 43 connected to the A/D converter array 42; and the driving mechanism 53 that makes the cutting target 51 movable or tiltable relative to the ultrasonic vibrator 20. The calculator 43 stores information in chronological order acquired by the sound-receiving element array 41 through scanning irradiation with the ultrasonic wave, converts the information stored in chronological order to space information, and acquires an acoustic intensity distribution.

As a result, the position and the angle of tilt of the cutting target 51 become adjustable relative to the ultrasonic vibrator 20. Thus, measurement by scanning with an ultrasonic wave can be made on the cutting target 51 even if the cutting target 51 is a metal workpiece having a complicated shape such as a mold. Thus, the smoothness of the surface of the cutting target 51 can be evaluated precisely. This measurement is applicable even to a surface colored with a cutting fluid that cannot be measured directly by visual inspection or with a camera, for example, so that a surface state can be evaluated without causing influence by the general physicochemical properties of a cutting fluid on measurement.

In this embodiment, the driving mechanism 53 moves or tilts the ultrasonic vibrator 20, the focusing part 31, the acoustic lens 32, and the sound-receiving element array 41 in response to a machining shape acquired from the numerical controller 60.

This achieves more precise measurement of the surface roughness of the surface of the cutting target 51 using the machining shape instructed from the numerical controller 60.

In this embodiment, the calculator 43 calculates the geometric dimensions and surface roughness of a fine structure based on the acquired acoustic intensity distribution.

Using the acoustic intensity correlated with the surface roughness makes it possible to acquire information about the geometric dimensions and surface roughness of the entire area of the cutting target 51.

Figure 3:
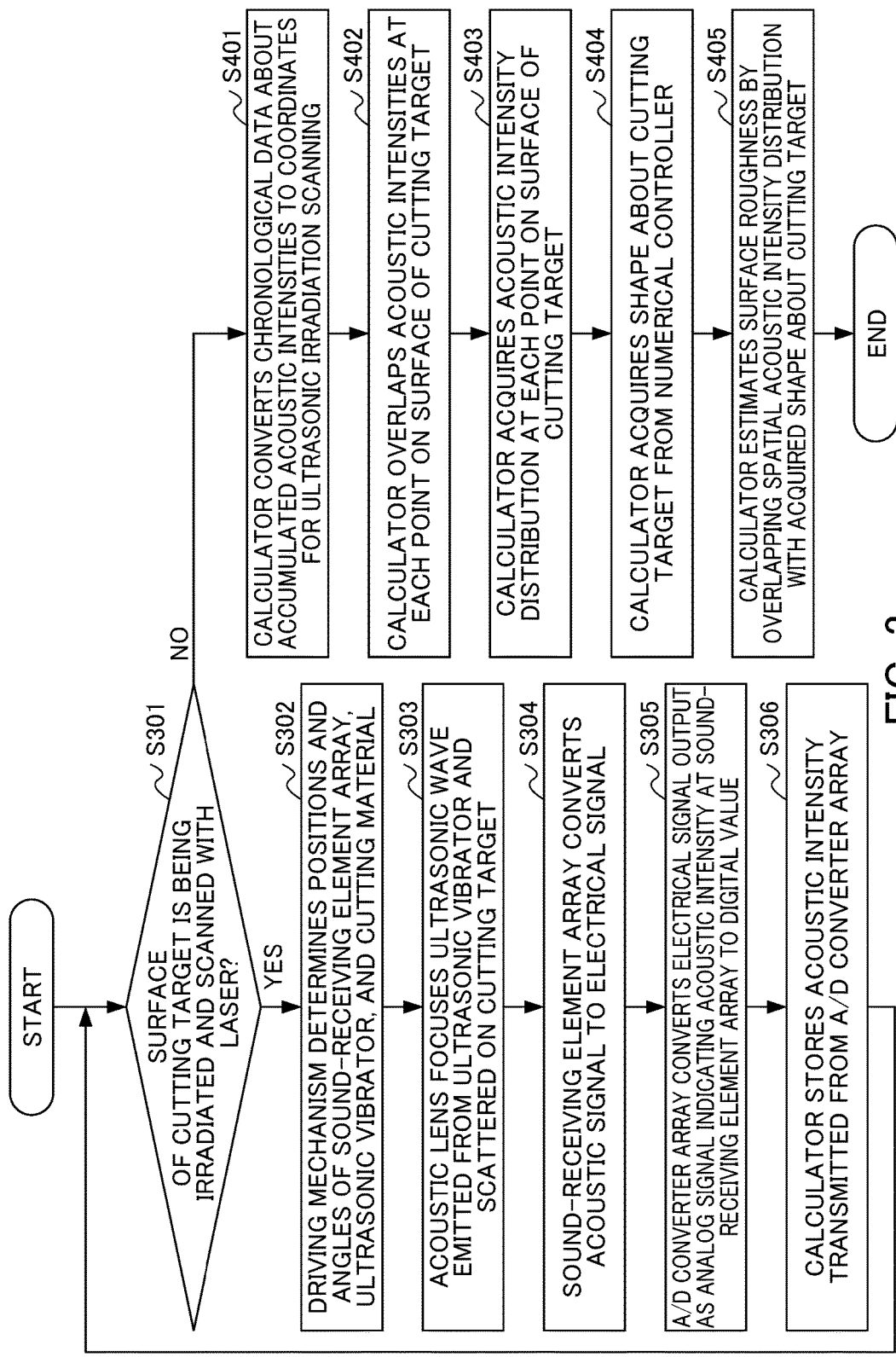
FIG. 3 is a flowchart showing a flow of measurement processing by a measurement device according to a second embodiment.
Figure 4:
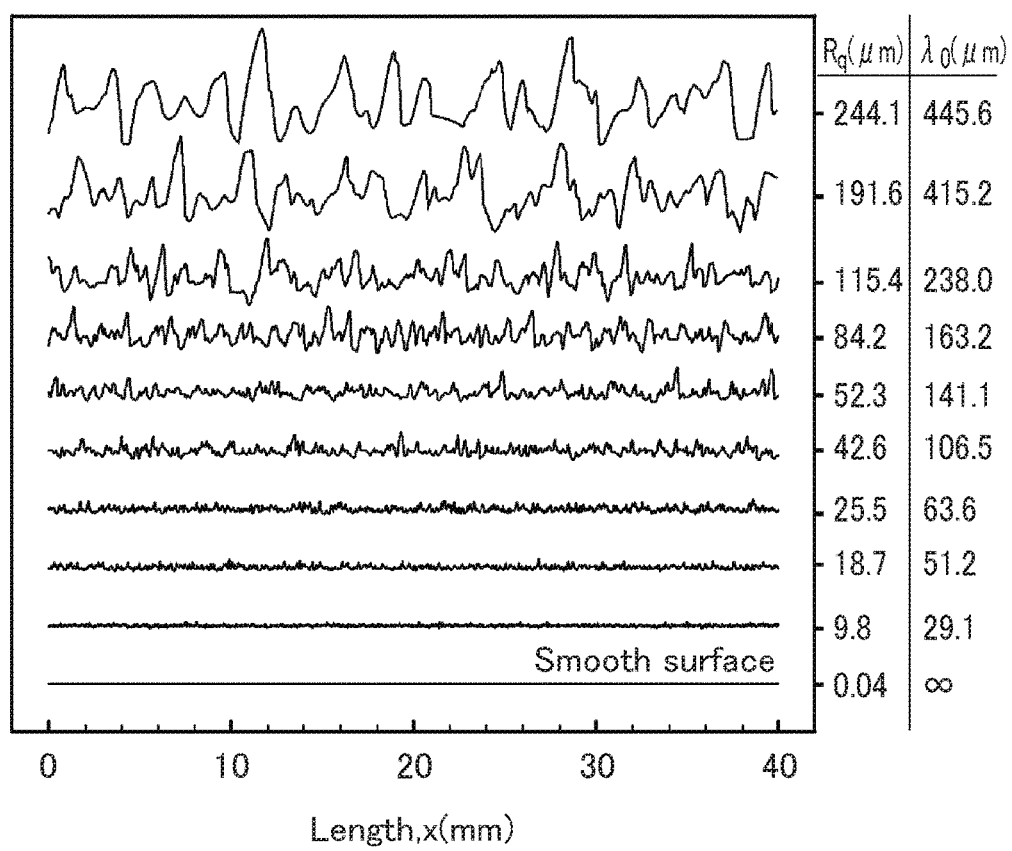
FIG. 4 is a graph showing the profile curve of a surface of a test piece described in non-patent document 1.
Figure 5:
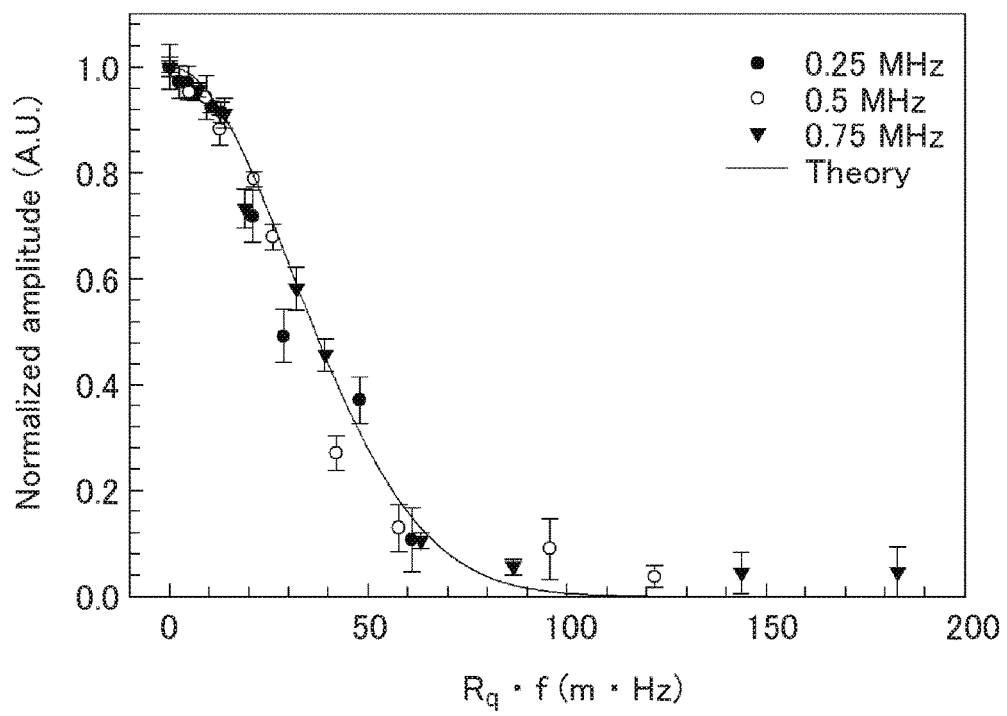
FIG. 5 is a graph showing a relationship between a reflection intensity (coherent component) and surface roughness Rq described in non-patent document 1.

The following describes processing of calculating the dimensions and surface roughness of a fine structure on a surface of the cutting target 51 followed by a measurement device 1 according to a second embodiment. FIG. 3 is a flowchart showing the flow of the measurement processing by the measurement device according to the second embodiment.

As shown in FIG. 3, processes from step S301 to S306 are the same as the processes from step S101 to S106 of FIG. 2 respectively, and processes from step S401 to S403 are the same as the processes from step S201 to S203 of FIG. 2 respectively. The processing of the second embodiment shown in FIG. 3 differs from the processing of the first embodiment in terms of processes in steps S404 and S405 performed for estimating surface roughness.

In step S404, a machining shape about the cutting target 51 is acquired from the numerical controller 60. In step S405, a spatial acoustic intensity distribution is overlapped with the acquired shape information about the cutting target 51 to estimate surface roughness (S405).

The foregoing second embodiment achieves effects comparable to those achieved by the first embodiment. In the second embodiment, the calculator 43 is configured to be capable of displaying the acquired spatial acoustic intensity distribution while overlapping the spatial acoustic intensity distribution with the machining shape acquired from the numerical controller 60.

Thus, the plane quality of the fine structure on the surface of the cutting target 51 as a measurement target can be visualized correctly. For example, predetermined areas may be set and each area may be displayed on the display 70 in such a manner that surface roughness in each area is visually recognizable.

It should be noted that the present invention is not limited to the above-described preferred embodiments but the present invention can be changed, where appropriate. For example, the driving mechanism 53 can be configured as a robot. In an example of an applicable configuration, the ultrasonic vibrator 20 is arranged at a machine as an arm-type robot and the ultrasonic vibrator 20 is moved three-dimensionally by the robot.

EXPLANATION OF REFERENCE NUMERALS

1 Measurement device
20 Ultrasonic vibrator
32 Acoustic lens
41 Sound-receiving element array (sound-receiving element unit)
42 A/D converter array (A/D converter unit)
43 Calculator
51 Cutting target (machining target, measurement target)
53 Driving mechanism
60 Numerical controller
70 Display

What is claimed is:

1. A measurement device that measures a target to be machined by a machine tool as a measurement target, comprising:
    an ultrasonic vibrator that emits an ultrasonic wave to the measurement target, which is reflected and/or diffracted from the measurement target,
    an acoustic lens that focuses the reflected and/or diffracted wave,
    a sound-receiving element unit that converts the ultrasonic wave focused by the acoustic lens to an analog electrical signal;
    an A/D converter unit that converts the analog signal from the sound-receiving element unit to a digital signal;
    a calculator connected to the A/D converter unit;
    a numerical controller that gives a command about a machining shape; and
    a driving mechanism that makes the ultrasonic vibrator, the acoustic lens, and the sound-receiving element unit move and tilt relative to the measurement target in response to the machining shape acquired from the numerical controller, wherein
    the calculator stores information in chronological order acquired by the sound-receiving element unit through scanning irradiation with the ultrasonic wave, converts the information stored in chronological order to space information, and acquires an acoustic intensity distribution.

2. The measurement device according to claim 1, wherein the calculator is capable of calculating the geometric dimensions and surface roughness of a fine structure based on the acquired acoustic intensity distribution.

3. The measurement device according to claim 1, wherein the calculator is capable of displaying the acquired spatial acoustic intensity distribution while overlapping the spatial acoustic intensity distribution with the machining shape.

* * * * *